May 23, 1944. A. L. ARMENTROUT 2,349,333
MECHANISM FOR SYNCHRONIZING POWER UNITS
Filed Sept. 23, 1942  2 Sheets-Sheet 1
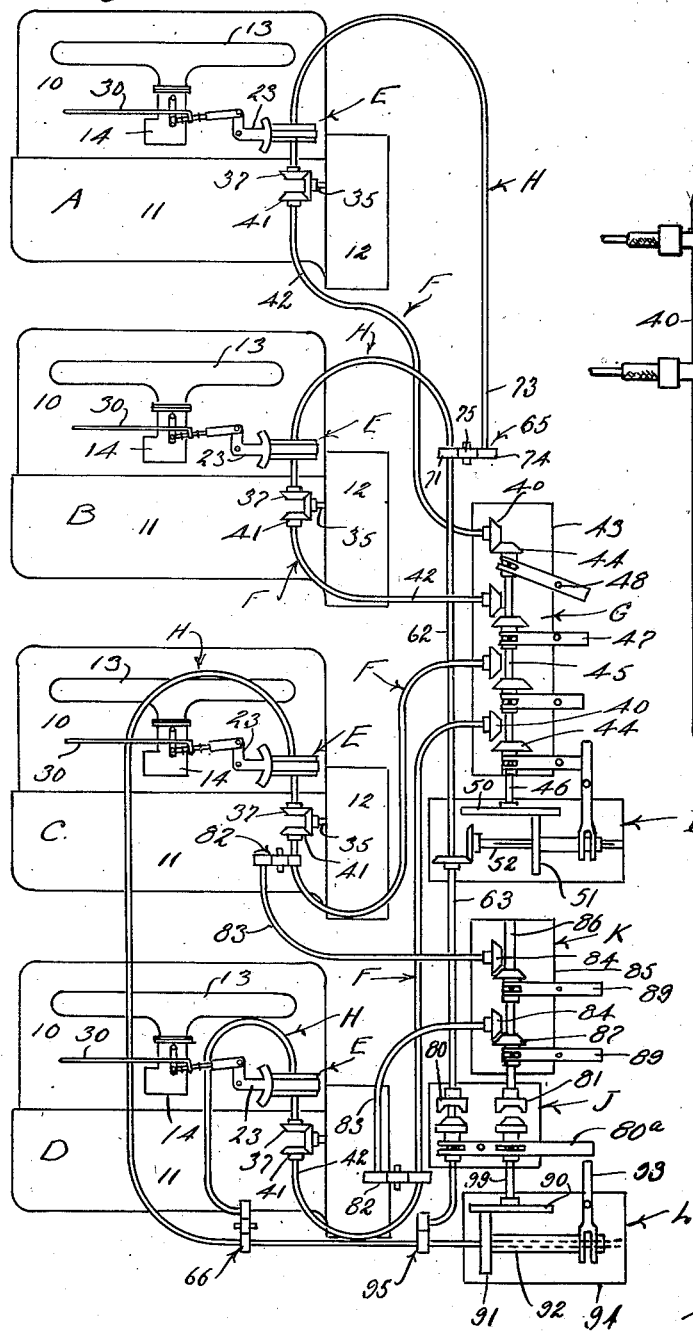
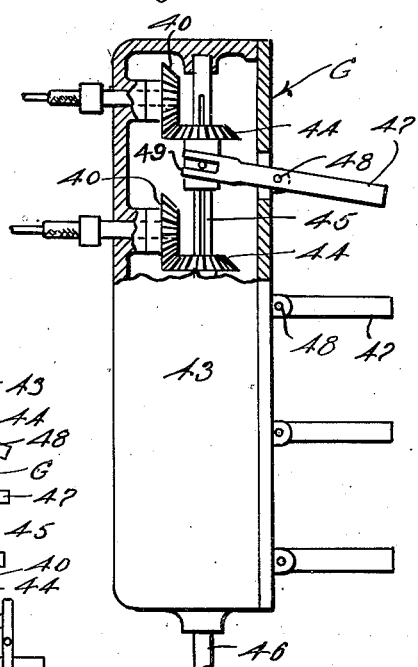
Inventor
Arthur L. Armentrout
by
Attorney May 23, 1944.   A. L. ARMENTROUT   2,349,333
MECHANISM FOR SYNCHRONIZING POWER UNITS
Filed Sept. 23, 1942   2 Sheets-Sheet 2
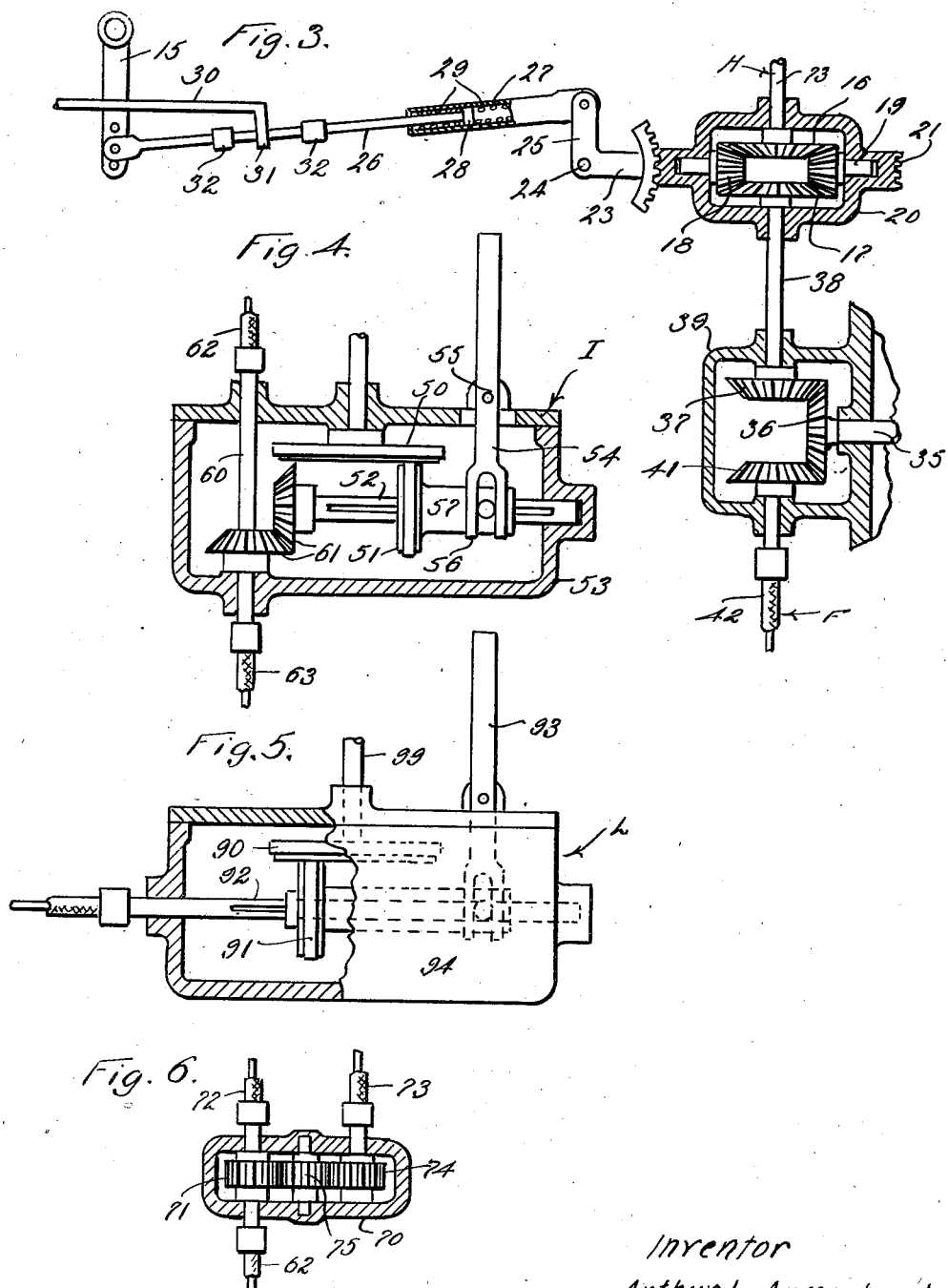
Inventor
Arthur L. Armentrout
by
Attorney Patented May 23, 1944

2,349,333

UNITED STATES PATENT OFFICE 2,349,333

MECHANISM FOR SYNCHRONIZING POWER UNITS

Arthur L. Armentrout, Long Beach, Calif.

Application September 23, 1942, Serial No. 459,413

10 Claims. (Cl. 60—97)

This invention relates to a mechanism for synchronizing power units, or the like, and it is a general object of the invention to provide a simple, effective, mechanical means for regulating and synchronizing a plurality of individually operating units such, for example, as a plurality of engines.

There are numerous situations in which a plurality of units such as engines, or the like, operate independently and where it is highly desirable that they operate in synchronism. As an example, in the case of large aircraft, it is common to provide four engines as the means of propulsion. These engines are usually of the same size and for various reasons it is highly desirable for most purposes that they operate synchronously. In such installations it is common to provide individual throttle controls for the engines and to provide variable pitch propellers so that the operator can, through manipulation of these various elements, approach synchronous operation. However, it is extremely difficult, if not impossible, to obtain accurate synchronization.

A general object of this invention is to provide a mechanism whereby any one of a group of units, such as engines, can be selected by the operator as the master which will control all of the other units. With the present invention when one unit has been selected as the master unit all of the other units are automatically regulated or adjusted so that they are maintained in synchronism with the master unit.

It is an object of the present invention to provide a simple means whereby the speed of the master unit may be varied at will, resulting in corresponding variation of all of the units so that they stay in synchronism with the master unit.

A further object of the present invention is to provide a group selecting means whereby a plurality of units, such as engines, may be operated in synchronism with one master unit, or may be divided into groups or banks, each of which has a master unit and each of which can be varied as to speed independently of the other.

The various objects and features of my invention will be best and more fully understood from the following detailed description of a typical form and application of the invention throughout which description reference is made to the accompanying drawings, in which:

Fig. 1 is a diagrammatic view illustrating the control system provided by the invention. Fig. 2 is an enlarged fragmentary sectional view of the main master selector mechanism whereby any one of the units of the entire group may be made the master to which the others are synchronized. Fig. 3 is an enlarged detailed view showing the mechanism that the present invention provides at each unit for operating the control or throttle of the unit, certain of the parts being shown in section. Fig. 4 is a sectional view of the speed regulator to be used in connection with the master selector. Fig. 5 is a view of the speed regulator to be used when the units are divided into separate groups or banks, certain of the parts being shown in section, and Fig. 6 is an enlarged detailed sectional view showing one of the connections provided in the mechanical drive of the invention.

My present invention is suitable, generally, for the synchronization and regulation of a plurality of units and since it may be applied to units of various kinds I wish it understood that it is in no way limited to use in connection with engines such as I am about to describe. In the particular embodiment of the invention illustrated I have applied the invention to four internal combustion engines which may, for sake of example, be considered to be the four engines of an aircraft or a boat. In the diagram, Fig. 1, the engines are shown schematically and they are designated A, B, C and D.

Each engine as indicated in Fig. 1 includes the usual cylinder block 10, crank case 11, flywheel housing 12, intake manifold 13, and carburetor 14. The carburetor is under control of the usual throttle 15 and by operation of the throttle 15 the operation of the engine can be controlled in the manner usual to mechanisms of this type.

The present invention provides a differential mechanism E for each of the units, that is for each engine. Each differential mechanism operates to relate the speeds of two driven elements so that differences in their speed result in rectifying operation of the engine throttle. In accordance with the invention one drive element of the differential is operated directly by the unit which that differential controls, while the other drive element is operated through the control system hereinafter described.

The present invention is not specifically concerned with the details of the differential mechanism E since it is merely essential that the mechanism be such as to relate the speeds of two driven elements in a manner to accomplish rectifying operation of the engine throttle when the speeds vary.

The particular differential mechanism illustrated in the drawings includes one drive element in the form of a bevel drive pinion 16 and another drive element in the form of a like bevel pinion 17. The pinions are mounted co-axially and in opposed relation to both engage planetary gears 18. The planetary gears are carried on spindles 19 mounted in a planetary body 20. The planetary body 20 is rotatably mounted concentric with the pinions 16 and 17 and has an external gear portion 21 formed on it to operate the throttle 15. In the arrangement illustrated the planetary body 20 is in the nature of a housing carrying the several gears.

In practice any suitable operating connection may be provided between the planetary member 20 and the engine throttle 15 so that the throttle 15 is operated when the planetary body 20 is operated. It will be apparent that when the pinions 16 and 17 of the planetary mechanism are revolving in opposite directions but at the same speed the planetary gears 18 revolve on their spindles 19 but the planetary body 20 remains stationary. When there is a variation in the speed of the pinions 16 and 17 the planetary gears 18 advance in one direction or the other, depending upon which of the pinions is rotating faster than the other, causing the planetary body 20 to revolve. The planetary body 20 will continue to revolve so long as there is a differential in speed between the pinions 16 and 17.

The operating connection between the planetary mechanism and the throttle 15 shown in the drawings includes a pivoted gear segment 23 meshing with the gear 21 of the planetary body 20. The segment 23 has a fixed pivotal axis 24 and a projecting arm 25. The arm 25 is connected with the throttle 15 through suitable linkage which is also related to the manual throttle provided in connection with the engine.

In the arrangement illustrated a rod 26 is pivotally connected with the throttle 15 and projects into a tube 27 pivotally connected to the arm 25 of the segment 23. A head 28 is provided on the rod 26 within the tube 27 and compression springs 29 are provided in the tube at either side of the head 28 to normally hold the rod 26 in a predetermined position with reference to the tube 27. It will be apparent, however, that through this spring connection the rod 26 can be moved relative to the tube 27 when sufficient force is applied to overcome the spring resistance. In practice the springs are sufficiently heavy so that they are not overcome during normal operations and, therefore, the structure formed by the rod 26 and tube 27 in effect forms a link between the throttle 15 and segment 23 communicating motion of the segment to the throttle.

A manual throttle control member 30 is preferably provided in connection with the engine and, as shown in Fig. 3, it includes a head 31 which operates between a pair of stops 32 on the rod 26. During normal operations of the control system provided by the invention the head 31 of the manual throttle control will be located between the stops 32 so that the automatic control operates freely. However, if it is desired to operate the throttle of the engine independently of the automatic control system of the present invention the manual throttle control 30 can be operated to move the head 31 into engagement with either one of the stops with sufficient force to overcome the spring means that couples the rod 26 with tube 27.

In accordance with the present invention one of the driven elements of the differential mechanism, that is, one of its pinions, is driven by the engine whose throttle is controlled by that particular mechanism. It will be apparent that various means may be provided for driving one of the differential pinions from a suitable part of the engine. In the case illustrated a power take-off shaft 35 from the engine drives the pinion 17 through bevel gears 36 and 37. The bevel pinion 36 is mounted on the power take-off shaft 35 whereas the gear 37 is on the shaft 38 driving the pinion 17. The gears may be arranged in a suitable housing 39, as shown.

The main master selector means provided by the invention contemplates driving the second, or other, drive pinion 16 of each differential mechanism from only one of the engines and it provides a means whereby the operator can select whichever engine he may desire as the one for the drive. In the form of the invention illustrated this main master selector means includes mechanical drives F connecting each engine with a selecting mechanism G and mechanical drives H connecting the selecting mechanism G with the second pinions of the differential mechanisms of the engines through the various connections hereinafter described.

In practice the mechanical drives F and H may be of any suitable character, for instance, they may be gear drives, shaft drives, belt drives, or other suitable driving means, or they may be any suitable combinations of such drives. In the case illustrated each drive F is from the power take-off shaft 35 of its engine to a bevel pinion gear 40 in the selector mechanism. I have shown a bevel gear 41 driven by the bevel pinion 36 of the power take-off and a flexible drive shaft 42 driven by the pinion 41. The drive shaft 42 is directly connected with and drives the pinion 40.

The selecting mechanism G, as shown in Fig. 2, includes the several pinions 40 mounted in a housing 43 to cooperate with bevel gears 44 slidably keyed on a common shaft 45 carried in the housing 43. The shaft 45 is mounted so that it has its gear carrying portion within the housing 43 and a driving end 46 projecting from the housing to operate the mechanism hereinafter described. The gears 44 are slidably keyed on the shaft 45 so that they can be moved into and out of engagement with the pinions 40. In the arrangement shown in the drawings each gear 40 is under control of a lever 47 pivoted at 48 and having a suitable yoke connection 49 with the gear, as clearly shown in Fig. 2. The outer or projecting ends of the lever 47 are at the exterior of the housing 43.

With the gear arrangement just described it will be apparent that the shaft 45 of the selecting mechanism may be driven from any one of the pinions 40 depending upon which one of the gears 44 is put into operation. In the case illustrated the uppermost pinion 40, which is the pinion driven from the motor A, is engaged to drive the shaft 45. It is to be understood, of course, that suitable control or interlocking means may be provided in connection with the several levers 47 so that only one can be operated at a time, that is, so that only one of the gears 44 can be engaged at any one time.

The drives H which connect the selecting mechanism G with the drive pinions 16 of the several differential mechanisms are preferably operated through a speed regulating means I, so that the operator can at will speed up or slow down the operation of pinions 16 of the differential mechanisms, and thereby effect regulation of the speed of the several engines.

In the mechanism illustrated means I is driven by the driving end 46 of shaft 45 of the selecting mechanism G. The particular speed regulating means illustrated includes a variable friction drive involving a driving disc 50 operated by the end 46 of the shaft 45 and a driven friction wheel 51 slidably keyed on a shaft 52 so that it has frictional engagement with the face of the disc 50.

The variable drive just referred to is contained in a housing 53 and the position of the wheel 51 along the shaft 52 is under control of an operating lever 54 pivotally mounted at 55 and having a yoke connection 56 with the hub extension 57 of the wheel 51. Through the means I the shaft 52 may be driven at exactly the same speed as the shaft 56 by properly locating the wheel 51 with reference to the plate 50. However, by operating the lever 54 it is possible to either speed up or slow down the wheel 51 relative to the shaft 45 depending upon the direction in which the lever is operated.

The shaft 52 operates the drives H to the pinions 16 of the several differential mechanisms. In the case illustrated a propeller shaft 60 is operated from the shaft 52 through a suitable bevel gear drive 61. The propeller shaft 60 projects from opposite sides of the housing 53 and a flexible propeller shaft extension 62 connects to one end of the shaft 60 and drives the pinions 16 of the units A and B while a flexible propeller shaft extension 63 connects to the other end of the shaft 60 and drives the pinions 16 of the units C and D.

The flexible drive shaft 62 branches at 65, one branch going to the pinion 16 of the unit A and the other to pinion 16 of unit B. In similar fashion the flexible drive shaft 63 branches at 66, one branch going to the pinion 16 of unit C and the other branch going to pinion 16 of unit D.

Where flexible drive shafts are employed, as I have described, and it is desired to divide them into branches, this may be done through simple mechanisms such as are shown in Fig. 6. In the mechanism there illustrated the incoming drive shaft, say shaft 62, enters a housing 70 where it drives a gear 71. A branch shaft 72 projects from the housing 70 and is driven with the gear 71. A second branch shaft 73 projects from the housing and is driven by a gear 74 within the housing. An idler gear 75 connects the gears 71 and 74.

With the mechanism thus far described it will be apparent that the differential pinion 17 of each differential mechanism is driven by and with the engine which the mechanism controls, whereas the other differential pinion of each mechanism is driven by and with whichever unit is engaged through the selecting mechanism G. In the case illustrated the gear 40 of the unit A is engaged and, therefore, all of the pinions 16 are driven by unit A. The pinions 16 and 17 of the differential mechanism controlling unit A being both driven by unit A operate at exactly the same speed and there will be no operation or movement of the throttle of unit A. However, since the two differential pinions of each of the other differential mechanisms are driven from different units, that is, one by the unit controlled and the other by the master unit A, their throttles are subject to operation. If one of the units, say for instance unit B, should vary in speed from unit A, there will be a differential in speed between the pinions 16 and 17 of the differential mechanism controlling unit B which will immediately result in operation of the differential body causing the throttle 15 of unit B to correct the lack of synchronism. Through the system of interconnection provided by the invention the several units B, C and D will be automatically corrected or adjusted so that they stay in synchronism with unit A.

The invention provides means for dividing the several units into two independently operating groups each one of which may be varied as to speed, and each one of which involves means whereby its several units stay in synchronism. The particular mechanism illustrated involves a disconnect means J controlling the group operation, a second master selector mechanism K and a speed control means L for the second group or bank of units.

The disconnect means J is a clutch mechanism involving a clutch 80 in the drive connection 63 and a clutch 81 between the means K and L. As I have shown in the diagram, Fig. 1, the clutch 80 is inserted in the drive 63 so that the drive from the speed regulator I to the units C and D can be broken or disconnected, thus separating units C and D from units A and B insofar as control of their differential pinions 16 is concerned. A single control lever 80$^a$ may be provided for operating both of the clutches.

The drives from the units C and D to the selector means G are divided at 82 so that each has a branch drive 83 extending to the selector means K where each drives a gear 84 within a housing 85. The shaft 86 arranged in the housing slidably carries gears 87 designed to be operated into engagement with the gears 84 in the same manner that gears 44 are engageable with gears 40. The gears 87 are under control of levers 89 corresponding to levers 47.

Through the mechanism just described gears 84 of the means K are driven whenever the units C and D are in operation. The shaft 86 can be driven from either of the gears 84 depending upon which one is engaged. When the several engines are divided into groups, for instance, when units C and D are separated from units A and B by opening clutch 80, the operator may select either unit C or D as the master unit by engaging the proper gear 84, whereupon by closing clutch 81 the master selector K may be coupled with the speed control L by shaft 99 which, in turn, is connected with the pinions 16 of units C and D. The speed control L is similar, generally, to the speed control I. It includes a drive disc 90 driven from the shaft 86 through the clutch 81, and a wheel 91 slidably keyed on a shaft 92 to be driven from the face of the disc 90. A control lever 93 is provided for varying the position of the wheel 91 relative to the disc 90 in order to control the speed ratio between the shafts 86 and 92. The shaft 92 projects from the housing 94 of the speed control L and is coupled at 95 with the section of shaft 63 beyond the clutch 80 from the means I.

With the mechanism just described, when the clutch 80 is disconnected and the clutch 81 engaged, the pinions 16 of the units C and D are driven from the unit selected through the means K, the clutch 81, speed control L and connection 95. When the units are thus divided into groups or banks the gears 40 of means G connected with the units separated to form the second group are driven, but the operator does not engage them but engages one of the pinions of the first group, as, for instance, one of the gears of A or B. In practice it is desirable to design the clutch means J so that there is a neutral position, as shown in Fig. 1, where both clutches 80 and 81 are disengaged.

When the units are divided into two groups by the means hereinabove described the first group, that is, the group formed by units A and B, may be synchronized to whichever unit is selected as the master and the speed of operation of that group can be varied by the means I. In like manner the units C and D can be operated to synchronize to whichever unit is selected through the means K and the speed of operation can be varied by the means L. Through the group control provided by the present invention the operator can readily divide the units into two groups and accelerate one and decelerate the other, or he may in any manner independently control their speeds to effect any desired relative operation of the two groups. This is an important feature in connection with the power means of boats where it may be desired to use one group of units A and B to drive the left propellers and the other group, say units C and D, to drive the right propellers. Through the individual speed control of the two groups it is possible to effect steerage by speed regulation of the units.

The various drives referred to, except those involving gears or ordinary shafting, may be flexible shafting or linked drive chains in suitable housings. Such flexible drives may be extended to various locations and may be connected with the other parts, either drive parts or driven parts, by fittings such as are commonly used in connection with this type of apparatus.

Having described only a typical form and application of my invention, I do not wish to be limited or restricted to the specific details herein set forth, but wish to reserve to myself any variations or modifications that may appear to those skilled in the art or fall within the scope of the following claims.

Having described my invention, I claim:

1. In combination a plurality of units each under control of a throttle, a differential mechanism for operating each throttle and each including two driven members having a planetary connection which is connected with the throttle, one of the driven members of each mechanism being driven by the unit controlled by that mechanism, and a selector means whereby any one of the units can be connected to drive the other driven member of each differential mechanism, the selector means including a unitary mechanism remote from the differential mechanisms and having a plurality of elements each driven by one of the units and a driver having driving connection with each of said other driven members of the differential mechanisms and engageable to be driven by any one of the said elements.

2. In combination a plurality of units each under control of a throttle, a differential mechanism for operating each throttle and each including two driven members having a planetary connection which is connected with the throttle, one of the driven members of each mechanism being driven by the unit controlled by that mechanism, and a selector means whereby any one of the units can be connected to drive the other driven member of each differential mechanism, the selector means including a unitary mechanism located at a control point and having a plurality of gears each driven by one of the units, a shaft operatively connected to the said other driven members, and gears carried by the shaft selectively engageable with the first mentioned gears.

3. In combination a plurality of units each under control of a throttle, a differential mechanism for operating each throttle and each including two driven members having a planetary connection which is connected with the throttle, one of the driven members of each mechanism being driven by the unit controlled by that mechanism, a selector means located at a control point remote from the units whereby any one of the units can be connected to drive the other driven member of each differential mechanism, and means located at said control point for varying the speed of the drive effected through the selector means.

4. In combination a plurality of units each under control of a throttle, a differential mechanism for operating each throttle and each including two driven members having a planetary connection which is connected with the throttle, one of the driven members of each mechanism being driven by the unit controlled by that mechanism, a selector means in the form of a unitary mechanism located at a control point whereby any one of the units can be connected to drive the other driven member of each differential mechanism, and a variable speed friction drive located at said control point for varying the speed of the drive effected through the selector means.

5. In combination a plurality of units each under control of a throttle, a differential mechanism for operating each throttle and each including two driven members having a planetary connection with a body adapted to rotate when there is a variation in speed between the driven members, a yielding link connection between the body and throttle, and a manually operable means for independently operating the throttle, one of the driven members of each mechanism being driven by the unit controlled by that mechanism, and a selector means whereby any one of the units can be connected to drive the other driven member of each differential mechanism.

6. In combination a plurality of units each under control of a throttle, a differential mechanism for operating each throttle and each including two driven members, one of which is driven by the unit the mechanism controls, a main selector means in the form of a unitary mechanism independent of the other mechanisms whereby any one of the units can be connected to drive the other driven members of the mechanisms, disconnect means whereby a certain group of the units can be disconnected from the main selector means, and a second selector means whereby any one of the units of the disconnected group can be connected to drive the said other driven members of the mechanisms controlling the disconnected units.

7. In combination a plurality of units each under control of a throttle, a differential mechanism for operating each throttle and each including two driven members one of which is driven by the unit the mechanism controls, a main selector means whereby any one of the units can be connected to drive the other driven members of the mechanisms, disconnect means whereby a certain group of the units can be disconnected from the main selector means, a second selector means whereby any one of the disconnected units of said group can be connected to drive the said other driven members of the mechanisms controlling the units of said group, and individual speed control means for the two groups of units established by the disconnect means.

8. In combination a plurality of units each under control of a throttle, a differential mechanism for operating each throttle and each including two driven members one of which is driven by the unit the mechanism controls, a main selector mechanism whereby any one of the units can be connected to drive the other driven members of the mechanisms, disconnect means whereby certain of the units can be disconnected from the main selector mechanism, the disconnect means including a clutch in the drive from the main selector mechanism and said certain units, and a second selector mechanism whereby any one of the disconnected units can be connected to drive the said other driven members of the mechanisms controlling the disconnected units.

9. In combination a plurality of units each under control of a throttle, a differential mechanism for operating each throttle and each including two driven members one of which is driven by the unit the mechanism controls, a main selector means whereby any one of the units can be connected to drive the other driven member of the mechanisms, disconnect means whereby certain of the units can be disconnected from the main selector means, a second selector means whereby any one of the disconnected units can be connected to drive the said other driven members of the mechanisms controlling the disconnected units, and individual speed control means for the two groups of units established by the disconnect means, the speed control means including a variable friction drive for each group of units established by the disconnect means.

10. In combination, a plurality of units each under control of a throttle, a differential mechanism for operating each throttle and each including two driven members one of which is driven by the unit the mechanism controls, a main selector means whereby any one of the units can be connected to drive the other driven members of the mechanisms, disconnect means whereby certain of the units can be disconnected from the main selector means, the disconnect means including a clutch in the drive from the main selector means and said certain units, and a second selector means whereby any one of the disconnected units can be connected to drive the said other driven members of the mechanisms controlling the disconnected units, the speed control means including a variable friction drive for each group of units established by the disconnect means.

ARTHUR L. ARMENTROUT.